United States Patent
Funk et al.

(10) Patent No.: US 10,660,256 B2
(45) Date of Patent: May 26, 2020

(54) POWER CAPACITY EXPANSION ON AGRICULTURAL MACHINE

(71) Applicant: Deere & Company, Moline, IL (US)

(72) Inventors: Eric R. Funk, Apex, NC (US); Matt D. Bartelson, Bettendorf, IA (US); Quintin D. Rigert, Port Byron, IL (US); Grant J. Wonderlich, Milan, IL (US); Matthew L. Spencer, Bettendorf, IA (US); Pranay K. Bajjuri, Bettendorf, IA (US)

(73) Assignee: Deere & Company, Moline, IL (US)

( * ) Notice: Subject to any disclaimer, the term of this patent is extended or adjusted under 35 U.S.C. 154(b) by 167 days.

(21) Appl. No.: 15/613,601

(22) Filed: Jun. 5, 2017

(65) Prior Publication Data

US 2018/0343785 A1 Dec. 6, 2018

(51) Int. Cl.
| | |
|---|---|
| *A01B 71/06* | (2006.01) |
| *A01C 19/02* | (2006.01) |
| *H02M 3/155* | (2006.01) |
| *A01B 59/00* | (2006.01) |

(52) U.S. Cl.
CPC .............. *A01B 71/06* (2013.01); *A01B 59/00* (2013.01); *A01C 19/02* (2013.01); *H02M 3/155* (2013.01)

(58) Field of Classification Search
CPC ......... A01B 71/06; A01B 59/00; A01C 19/02; H02M 3/155
See application file for complete search history.

(56) References Cited

U.S. PATENT DOCUMENTS

| | | | | | |
|---|---|---|---|---|---|
| 3,690,395 | A | * | 9/1972 | Spiller .................... | A01B 51/00 180/6.48 |
| 4,114,082 | A | * | 9/1978 | Scheidler .............. | H02J 7/0024 320/117 |
| 4,196,785 | A | * | 4/1980 | Downing, Jr. ........... | B60K 6/24 180/6.28 |
| 4,992,672 | A | * | 2/1991 | Norton .................. | H02J 7/1438 307/10.1 |
| 5,166,538 | A | * | 11/1992 | Norton .................. | H02J 7/1438 307/10.1 |
| 5,532,914 | A | * | 7/1996 | Kageyama .............. | H02M 3/28 307/82 |
| 5,739,592 | A | * | 4/1998 | Rigsby ..................... | B60D 1/62 280/422 |

(Continued)

OTHER PUBLICATIONS

EP Application No. 18170914.8-1006 Extended European Search Report dated Oct. 21, 2018, 7 pages.

*Primary Examiner* — Darlene P Condra
(74) *Attorney, Agent, or Firm* — Joseph R. Kelly; Kelly, Holt & Christenson PLLC

(57) ABSTRACT

A towed agricultural machine includes a converter, configured to convert a first voltage potential generated by a generator to a second voltage potential. The second voltage potential powers a component of the towed agricultural machine. Further, the towed agricultural machine also includes a switch that senses the absence of the second voltage potential from the converter and switches to powering the subcomponent with a second voltage potential received from a source external to the towed agricultural machine. The second voltage potential output by the converter can also be combined, on a power bus, with the second voltage potential from the external source or another source.

20 Claims, 7 Drawing Sheets

(56) References Cited

U.S. PATENT DOCUMENTS

| | | | | |
|---|---|---|---|---|
| 5,998,944 A * | 12/1999 | Clutter | B66C 1/08 | 318/141 |
| 6,130,487 A * | 10/2000 | Bertalan | B60D 1/62 | 307/9.1 |
| 6,275,001 B1 * | 8/2001 | Dierker | F02N 11/0866 | 320/103 |
| 7,670,915 B1 * | 3/2010 | Ryan | H01L 21/28518 | 257/E21.424 |
| 7,876,104 B2 * | 1/2011 | Tarasinski | B60D 1/62 | 180/168 |
| 8,008,800 B2 * | 8/2011 | Mackin | A01D 41/1274 | 180/53.5 |
| 8,256,544 B2 * | 9/2012 | Tarasinski | A01B 59/00 | 180/53.5 |
| 8,640,799 B2 * | 2/2014 | Beeson | B23K 9/1006 | 180/53.5 |
| 9,030,040 B2 | 5/2015 | Tarasinski et al. | | |
| 9,291,678 B2 * | 3/2016 | Aalund | G01R 31/343 | |
| 10,017,138 B2 * | 7/2018 | Kamioka | H02J 7/16 | |
| 2002/0105227 A1 | 8/2002 | Nerone et al. | | |
| 2005/0067898 A1 * | 3/2005 | Gronbach | B60L 11/1868 | 307/10.1 |
| 2008/0087480 A1 * | 4/2008 | Tarasinski | A01B 59/00 | 180/65.25 |
| 2008/0109150 A1 * | 5/2008 | Pfohl | F02N 11/105 | 701/113 |
| 2009/0189450 A1 * | 7/2009 | Deng | H02J 7/0068 | 307/64 |
| 2009/0212740 A1 * | 8/2009 | Felps | H01M 10/425 | 320/134 |
| 2009/0305519 A1 * | 12/2009 | Tarasinski | B60D 1/62 | 439/35 |
| 2010/0308559 A1 | 12/2010 | Tarasinski | | |
| 2011/0053385 A1 | 3/2011 | Smith et al. | | |
| 2013/0162032 A1 * | 6/2013 | Matt | B60L 11/1811 | 307/10.1 |
| 2014/0084679 A1 | 3/2014 | Li et al. | | |
| 2014/0244082 A1 * | 8/2014 | Caron | B60K 6/46 | 701/22 |
| 2014/0285000 A1 | 9/2014 | Vonroth | | |
| 2015/0203060 A1 * | 7/2015 | Kamioka | B60R 16/033 | 307/10.1 |
| 2015/0224879 A1 | 8/2015 | O'Donnell et al. | | |
| 2017/0187317 A1 * | 6/2017 | Nakano | F04B 39/00 | |
| 2017/0210233 A1 * | 7/2017 | Yu | B60L 11/12 | |
| 2018/0132473 A1 * | 5/2018 | Diprose | G01R 27/18 | |

* cited by examiner

POWER CAPACITY EXPANSION ON AGRICULTURAL MACHINE

FIELD OF THE DESCRIPTION

The present description relates to an electrical system for agricultural equipment. More specifically, the present description relates to a plurality of electrical power supply systems for subcomponents on an agricultural machine.

BACKGROUND

There are a wide variety of different types of agricultural machines that are pulled by a towing vehicle, such as a tractor. Such machines may have elements (or subcomponents) that are powered by electrical power. The power requirements of the different elements may be different.

One example agricultural machine is a planting machine that includes row units configured to plant seeds in a plurality of rows. Examples of planting machines include, but are not limited to, box drills, air seeders, and row crop planters. In operation, the planting machine is connected to, and towed by, a tractor. As the planting machine is pulled by the tractor, seeds are planted in furrows or trenches with proper depth based on various features such as crop type and soil conditions.

In addition to planting seeds for crops, such as corn, soybeans, sunflowers, and sugar beets (among others), some example agricultural machines can be similarly used to evenly distribute other agricultural material such as fertilizers, pesticides and herbicides. They can be used in tillage and harvesting operations as well as a whole host of other agricultural operations. Additionally, providing sufficient electrical power to the elements (e.g., the row units) is important in maintaining a proper working order, and is also important to diagnose problems that may occur during operation.

The discussion above is merely provided for general background information and is not intended to be used as an aid in determining the scope of the claimed subject matter.

SUMMARY

A towed agricultural machine includes a converter, configured to convert a first voltage potential generated by a generator to a second voltage potential. The second voltage potential powers a component of the towed agricultural machine. Further, the towed agricultural machine also includes a switch that senses the absence of the second voltage potential from the converter and switches to powering the subcomponent with a second voltage potential received from a source external to the towed agricultural machine. The second voltage potential output by the converter can also be combined, on a power bus, with the second voltage potential from the external source or another source.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

There are a wide variety of towed agricultural machines that receive electrical and other power from a towing vehicle, such as a tractor. The present description will proceed with respect to the towed agricultural machine being a planting machine, but it will be understood that this is just one example.

Typically, row units of a planter have a variety of subcomponents that are configured to operate using a particular voltage potential generated from an electrical power supply. For example, electric motors may be used to drive a seed metering device and a seed delivery system on the row unit. Additionally, controllers, diagnostic components, other actuators and meters may also be provided on the row unit and may be configured to operate using one or more voltage potentials. Some subcomponents may be powered by a towing vehicle, such as through an electrical connection to a generator or power supply on the tractor, and some may be powered by a power supply on the planter, itself. However, as the amount of subcomponents on a towed agricultural machine (e.g., on a row unit) increases, the need for electrical power also increases. Therefore, there is a need to develop new sources of electrical power that may be used to augment power available to a variety of different electrical subcomponents on the row unit or other towed agricultural machine.

Furthermore, it may also be determined that a particular source of electrical power is not readily available at a given moment in time. For instance, under some circumstances, a generator on a row unit may not be operating. Therefore, it may also be helpful to detect a particular operating condition of a given electrical power supply system, and, based on the detected condition, switch primary electrical sources in order to allow continued operation of the subcomponents (or a predetermined subset of the subcomponents) on a row unit. In one example, this may allow for various diagnostic components to maintain an operating state, even while an electrical power supply on the towed machine is not operating.

Figure 1:
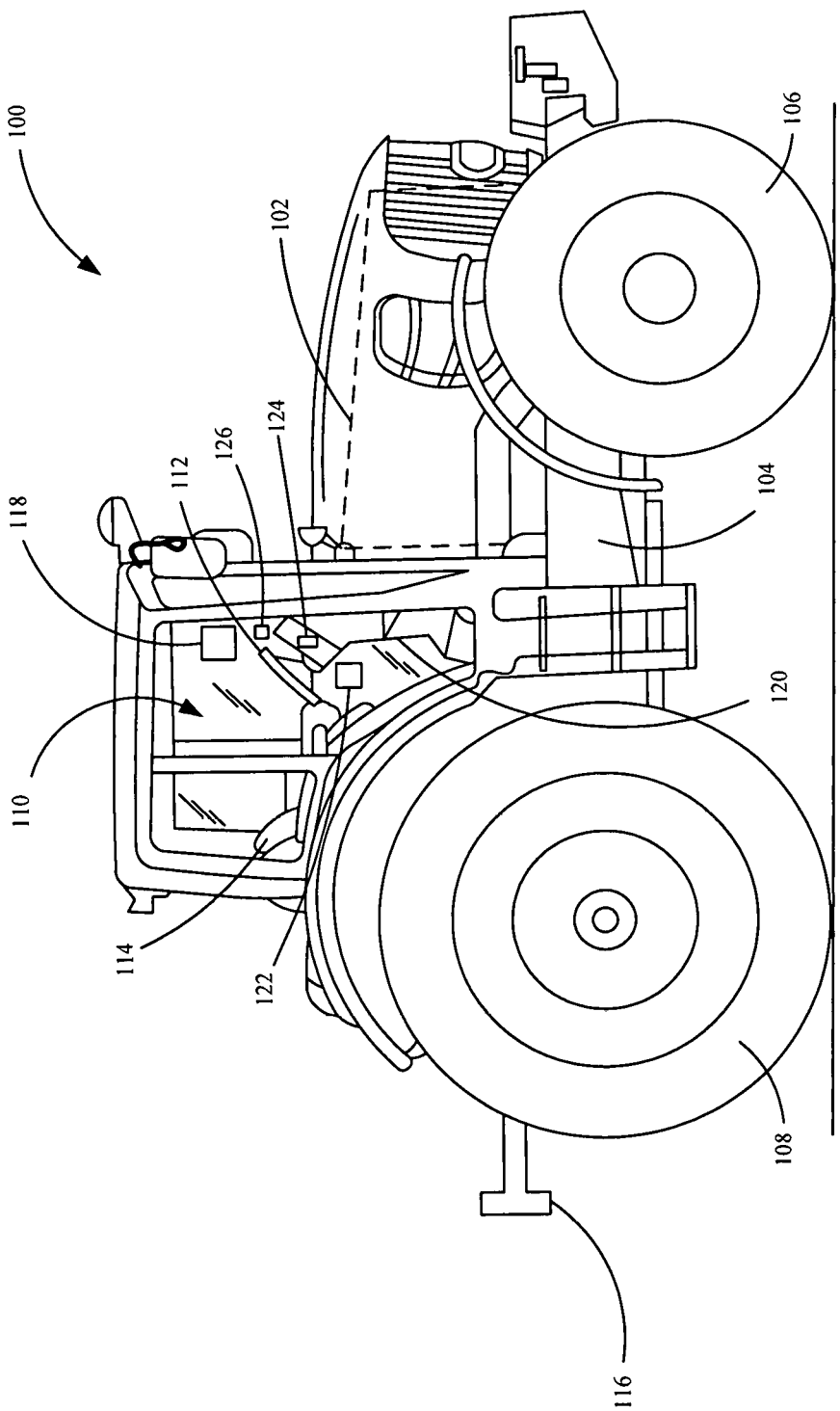
FIG. 1 is a diagrammatic view of an agricultural vehicle in accordance with one example.

FIG. 1 is a diagrammatic view of an agricultural vehicle 100 in accordance with one example. Agricultural vehicle 100 is configured to pull an agricultural planting machine (such as the agricultural planting machine 200 shown and described below with respect to FIG. 2.) Agricultural vehicle 100 comprises a power source 102, a frame 104, front wheels 106, rear wheels 108, and a power take-off 116. In one example, power source 102 comprises an engine and a battery (e.g. battery 402, engine 404, generators 405 and 405A shown and described in more detail in FIGS. 4A and 4B below). During operation, the engine may be configured to drive a shaft that is used to drive rear wheels 108 and front wheels 106 over a gear, as well as power take-off 116 which is configured to transfer the mechanical energy generated by the engine to components of the agricultural planting machine. The battery (or generator(s)) on vehicle 100 may be used to provide electrical power to various components of agricultural vehicle 100 and other subcomponents of machine 200 as will be discussed later.

In some examples, agricultural vehicle 100 further comprises an operator compartment 110. Operation compartment 110 may comprise a terminal 118, a seat 114, a steering component 112, a power take-off switch 126, a gas pedal 120, an ignition switch 124 and a throttle lever 122. Seat 114, steering component 112, gas pedal 120 and throttle lever 122, in one example, operate in accordance with their known operating functions.

Also, in one example, terminal 118 includes a display and a keyboard, a keypad or touch sensitive screen and may include other user interface mechanisms. Terminal 118 may allow an operator of agricultural vehicle 100 to provide an input to run various diagnostic tests on the various components of agricultural vehicle 100 and subcomponents of the agricultural planting machine 200.

Further, ignition switch 124 may be configured to selectively control power to various components of agricultural vehicle 100 using power source 102, and, as will be discussed later, subcomponents of the machine 200 (such as a row unit attached to an agricultural planting machine). For example, ignition switch 124 may include a variety of positions configured to selectively provide electrical energy to various components and subcomponents based on a received user input moving switch 124 to a particular position. This may include a first position (or off-position) in which no, or very limited, power is supplied from power source 102. It may include a second position (or on position) in which power is supplied to a predetermined amount of components within agricultural vehicle 100 and/or subcomponents within the row unit, and it may include a third position (or start position), which, in turn, connects a starter to the battery such that the engine of agricultural vehicle 100 is started and, generally, powers most, if not all, of the components within agricultural vehicle 100 and at least some subcomponents of the row unit. However, it is expressly contemplated that other positions may be provided as well.

Additionally, power take-off switch 126 may allow an operator of agricultural vehicle 100 to selectively turn on or off power take-off 116 when the engine of agricultural vehicle 100 is operating. However, in other examples, power take-off 116 is configured to operate in other ways as well.

Figure 2:
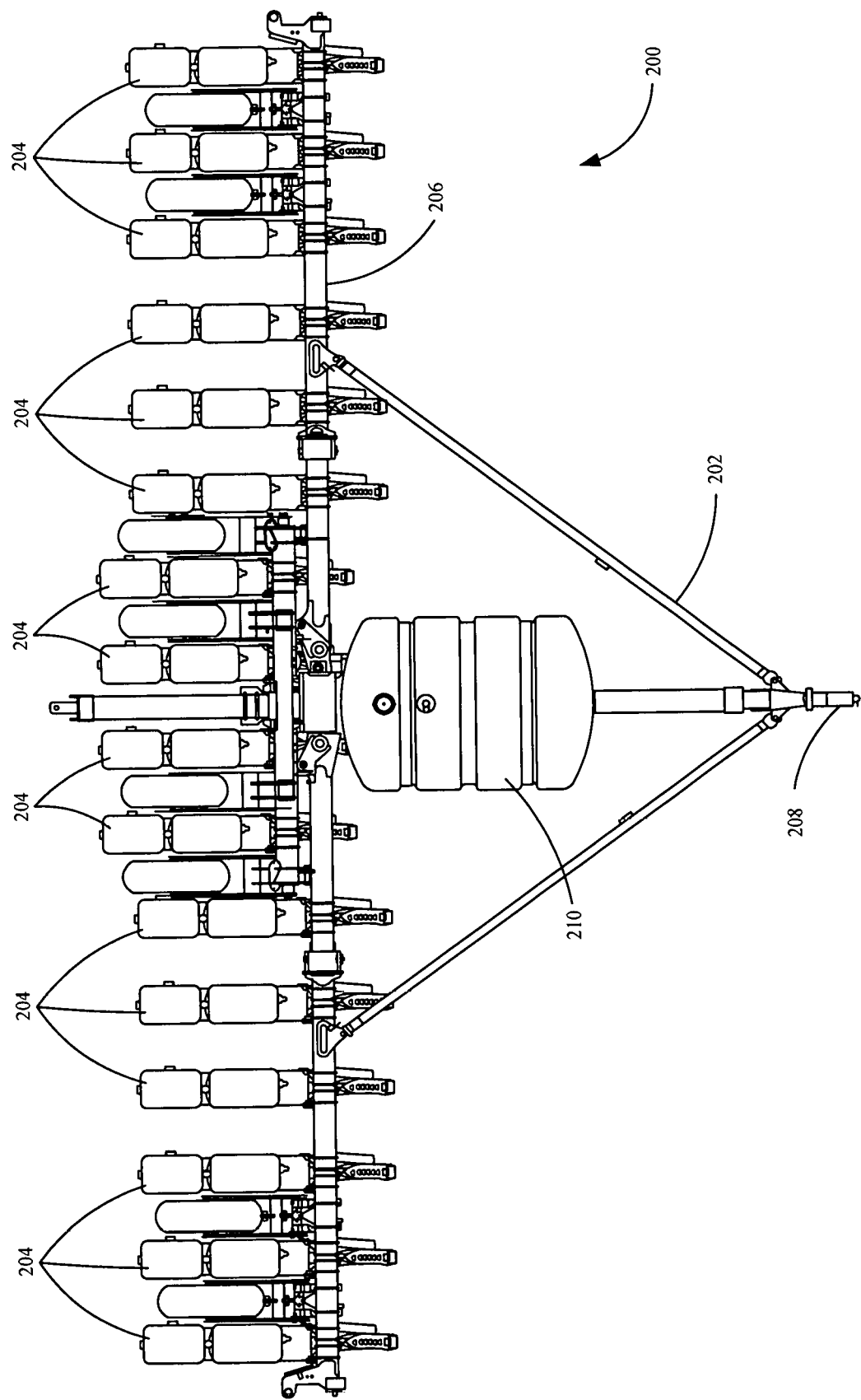
FIG. 2 is a diagrammatic view of one example of a towed agricultural machine in accordance with one example.

FIG. 2 is a diagrammatic view of an agricultural planting machine 200 in accordance with one example. Agricultural planting machine 200 includes a plurality of row units 204 configured to plant seeds in a plurality of rows. Therefore, in one example, the system includes an agricultural towing vehicle 100 configured to pull an agricultural planting machine having a plurality of row units 204. FIG. 2 shows that the row units 204 are coupled to a tool bar 206 of agricultural planting machine 200. Tool bar 206, as is illustratively shown, is coupled to a frame 202 which is connected to a mechanical coupling interface 208. In one example, mechanical coupling interface 208 is configured to couple agricultural planting machine 200 to an agricultural vehicle (for example, agricultural vehicle 100). The coupling of agricultural planting machine 200 to the agricultural vehicle 100 allows for the agricultural vehicle 100 to pull agricultural planting machine 200, and, consequently, row units 204. This allows for row units 204 to dispense agricultural material across a given terrain.

In addition, agricultural planting machine 200 may also include one or more tanks 210 (illustratively a fertilizer tank). Each tank 210 is configured to supply row units 204 with an agricultural product, such as, but not limited to, liquid material in the form of liquid fertilizer. In other examples, seed from a bulk container or containers can be provided to each row unit 204.

Figure 3:
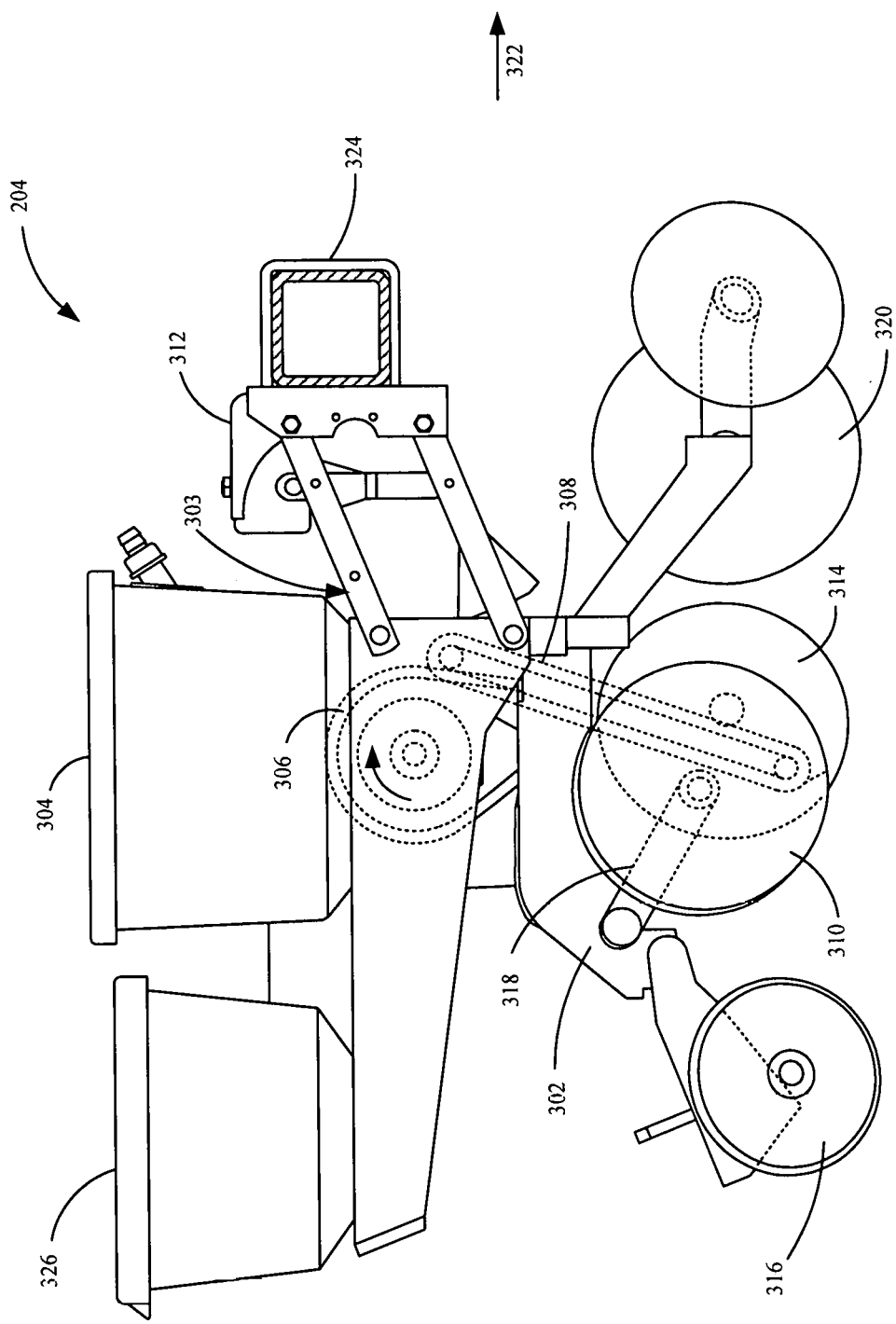
FIG. 3 is a more detailed diagrammatic view of one example of a row unit.

Alternatively, as shown, each row unit 204 can include a separate product tank (hopper) that holds agricultural product for the row unit. For example, as shown in FIG. 3 below, hoppers 304 and 326 can be used for seed and fertilizer or other chemical, respectively. Then, each row unit 204 can meter the product from the respective tank.

Row units 204 can comprise a variety of mechanisms for dispersing agricultural material to the ground, including one or more ground-engaging components. Examples of ground-engaging components are described in more detail below with respect to FIG. 3, and can include a trench opener or other component(s) for forming a trench or furrow in the soil, a ground-engaging seed firmer, and/or ground-engaging components utilized in a trench depth sensing system. One advantage to utilizing a plurality of row units is that agricultural planting machine 200 can consistently disperse the material in multiple rows as an agricultural vehicle makes a single pass across a field. Thus, row units 204 are typically identical across a given planting machine, but need not be identical.

It is also noted that while FIG. 2 illustrates agricultural planting machine 200 in the form of a row crop planter, in another example, agricultural planting machine 200 can comprise an air seeder or a box drill or other planters. It can also, as discussed above, be any of a variety of other machines that have at least some electrically driven subcomponents.

FIG. 3 is a side view showing one example of a row unit 204 in more detail. FIG. 3 shows that each row unit 204 illustratively has a frame 302. Frame 302 is illustratively connected to toolbar 206 by a linkage shown generally at 303. Linkage 303 is illustratively mounted to toolbar 206 so that it can move upwardly and downwardly (relative to toolbar 206).

In the example shown in FIG. 3, row unit 204 has its own seed hopper 304 that stores seed. The seed is provided from hopper 304 to a seed metering system 306 that meters the seed and provides the metered seed to a seed delivery system 308 that delivers the seed from the metering system 306 to the furrow or trench generated by the row unit.

FIG. 3 also shows that, in one example, row unit 204 illustratively includes a row cleaner 320, a furrow opener 314, a set of gauge wheels 310 connected to opener 314 by arm 318, and a set of closing wheels 316. It can also include an additional hopper 326 that can be used to provide additional material, such as fertilizer or another chemical.

In operation, as row unit 204 moves in the direction generally indicated by arrow 322, row cleaner 320 generally cleans the row and opener 314, which is shown as a double disc opener, opens a furrow or trench in the row. Gauge wheels 310 illustratively control a depth of the furrow, and seed is metered by metering system 306 and delivered to the furrow by seed delivery system 308. Closing wheels 316 close the trench over the seed. A downforce actuator 312 can also be provided to controllably exert downforce to keep the row unit in desired engagement with the soil.

It will also be noted that, while FIG. 3 shows one example of seed metering system 306 having a rotatable element, other types of seed metering systems could be used as well. In addition, while FIG. 3 shows that seed delivery system 308 is an assistive type of system, that actively captures the seed from the seed meter and physically moves the seed toward a lower opening where the seed exists into the trench, it could be any of a variety of other types of systems as well. For instance, one seed delivery system is a gravity drop system that includes a seed tube, that has an inlet position below the seed metering system. Metered seeds from the seed metering system 306 are dropped into the tube and fall (via gravitational force) through the seed tube into the seed trench. Other seed delivery systems may employ pneumatic pressure to convey the seed through a tube from the meter to the trench. All of these, and other types, of seed metering systems 306 and seed delivery systems 308 are contemplated herein.

It can thus be seen that planting machine 200, and its row units 204, may have subcomponents that are driven by different types of power sources. They may have hydraulically powered subcomponents (such as down force actuator 312) mechanically powered components (such as things driven by the power take-off output 116) and/or they may have electronically driven components, some of which are described in more detail below with respect to FIGS. 4A, 4B and 5.

Figure 4A:
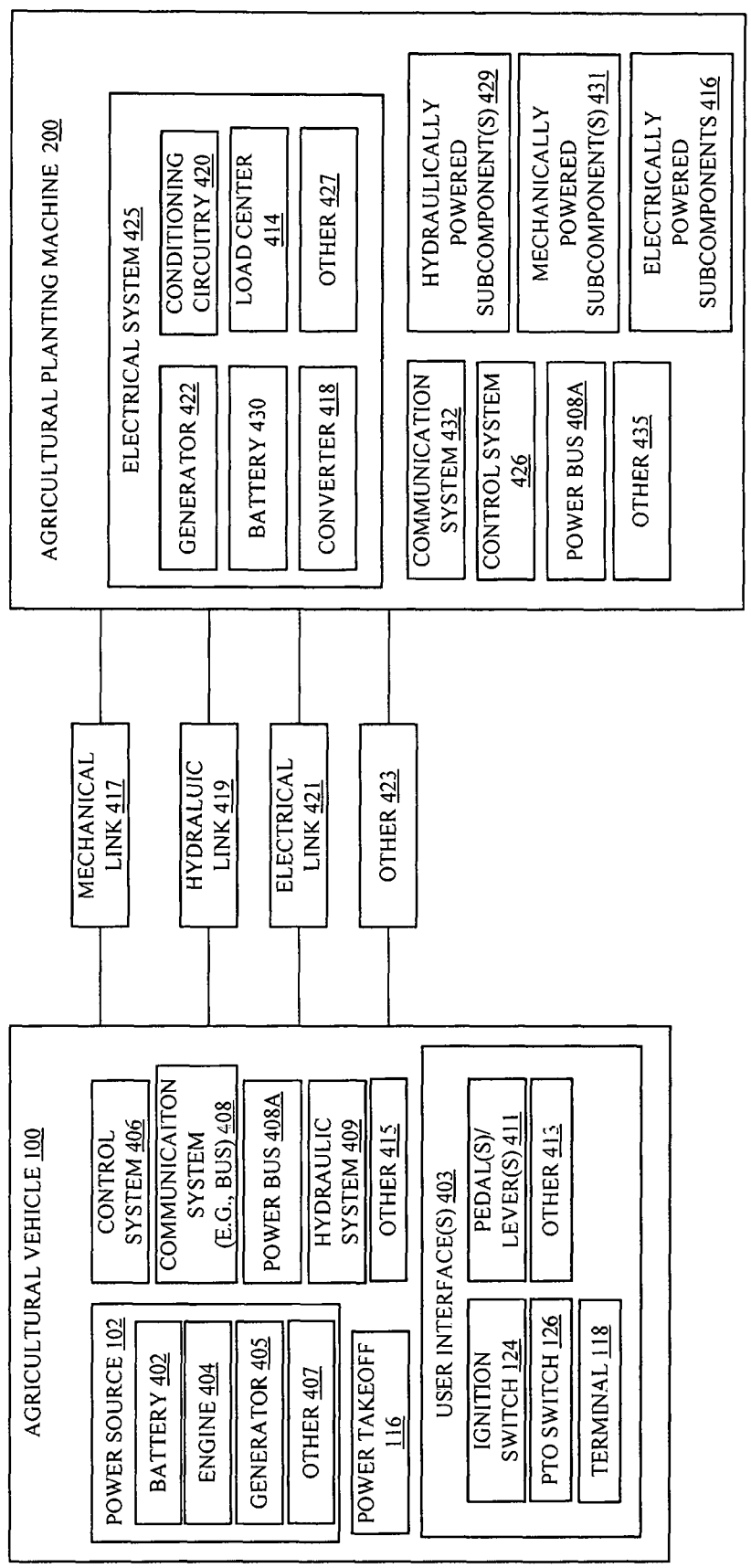
FIG. 4A is a block diagram of an agricultural vehicle coupled to a row unit in accordance with one example.

FIG. 4A is a block diagram showing one example of agricultural vehicle 100 and planting machine 200. FIG. 4A is used to describe a scenario in which one or more electrical power systems are unavailable so some of the electrically powered subcomponents are switched so they are driven by an available electrical power system. Some items in FIG. 4A are similar to those shown in FIGS. 1-3 above, and they are similarly numbered. FIG. 4A shows that vehicle 100 and machine 200 may be connected by a mechanical link 417, a hydraulic link 419, an electrical link 421 and other links 423.

FIG. 4A shows that power source 102 on vehicle 100 can include battery 402, engine 404, generator 405 (which may be driven by engine 404) and it can include other items 407. Also, machine 100 can include various user interface mechanisms 403, which can include the switches 124 and 126 and the terminal 118 described above with respect to FIG. 1. Interface mechanisms 403 can include pedals and levers 411, and a wide variety of other items 413, such as joy sticks, touch sensitive screens, audio or haptic output devices, etc. FIG. 4A also shows that vehicle 100 can include control system 406, communication system (or bus) 408, power bus 408A, hydraulic system 409, and it can include a wide variety of other items 415 as well. Control system 406 can include sensors that sense various items and a controller that generates control signals to control various systems and aspects of vehicle 100 and machine 200. Hydraulic system 409 can provide hydraulic fluid under pressure to power various items on vehicle 100 and/or machine 200. Communication system (or communication bus) 408 illustratively allows various items on vehicle 100 and/or machine 200 to communicate with one another.

In the example shown in FIG. 4A, agricultural machine 200 includes an electrical system 425 that can include a load center 414, converter 418, conditioning circuitry 420, a generator 422, battery 430 and it can include a wide variety of other items 427 as well. Machine 200 can also include power bus 408A, hydraulically powered subcomponents 429, mechanically powered subcomponents 431, electrically powered subcomponents 416, communication system 432, control system 426 and it can include a wide variety of other items 435.

Mechanical link 417 illustratively mechanically links (and can provide mechanical power from) vehicle 100 to machine 200, such as to provide power generated by power take-off system 116. Hydraulic link 419 can provide hydraulic power from hydraulic system 409 to items on agricultural machine 200. Electrical link 421 can provide electrical power and communication between power source 102 to items on machine 200. For instance, it can provide electrical power from battery 402 and/or generator 405, to power bus 408A on machine 200, etc.

Electrically powered subcomponents 416 can be configured to be powered using a particular voltage potential. In accordance with one example, multiple power supply systems can be used in order to ensure the subcomponents 416 can operate properly, under different circumstances. Additionally, control systems 406 and 426 on machine 200 or agricultural vehicle 100 (or both) may also be configured to determine a particular operating condition of the power supply systems (e.g., whether power source 102 and/or electrical system 425 are operational), and based on the determination, generate an indication to load center 414 to supply electrical power using only a subset of the power supply systems. The operation of the items in FIG. 4A in providing electrical power to subcomponents 416, from different sources, under different circumstances, will now be described in more detail.

In one example, generator 422 is configured to provide electrical power at different one or more voltage potentials (such as at 48 and 56 volts) which is used to power motors on row unit 204 responsible for driving delivery system 308 and seed metering device 306. However, it is expressly contemplated that generator 422 may provide fewer or different voltages as well and that the electrical power may be provided by generator 405 or some may be provided by each generator 405 and 422. Additionally, generators 405 and/or 422 may be in the form of an alternator configured to generate electrical power in the form of alternating current.

In one example, generator 422 is driven by power-take-off 116 located on agricultural vehicle 100. Power-take-off 116 may be configured to transfer mechanical power generated from engine 404, of agricultural vehicle 100, to generator 422. This allows generator 422 to generate electrical energy based on the mechanical power transferred from engine 404. Alternatively, it is also contemplated that generator 422 may be driven by a hydraulic motor supplied with hydraulic power from hydraulic system 409. Generator 405 may be driven by engine 404. Thus, when engine 404 is off, then neither generator 405 nor 422 will be on.

The generated electrical power (generated by one or both generators 405 and 422) may then be fed into power conditioning circuitry 420. Power conditioning circuitry 420, in one example, is configured to condition the electrical power generated by generators 405 and/or 422 such that the electrical power can be readily supplied to converter 418. For example, power conditioning circuitry 420 may include filtering and amplifying circuitry. It may also include a rectifier configured to convert alternating current into direct current. In other examples, power conditioning circuitry 420 may include an inverter configured to convert direct current power into alternating current. However, once the conditioned electrical signal is supplied to converter 418, converter 418 may then convert the electrical power into any suitable form to be used by subcomponents 416 of machine 200 or row unit 204. In one example, generators 405 and/or 422 generate an output at 48 and/or 56 volts and converter 418 is a DC/DC converter configured to step-down the 48/56 volt supply, generated by generators 405/422, to 12 volts.

The 12 volt output of converter 418 may then be supplied to a load center 414, (e.g., a switching component located on row unit 204), which is configured to distribute the 12 volts supply to subcomponents 416 over bus 408A. However, it is also expressly contemplated that other converted voltages may be generated as well, depending on the needs of the various subcomponents 416 on machine 200 or row unit 204.

There may be times when generators 405 and/or 422 (or both) is not operating. For example, when engine 404 of agricultural vehicle 100 is not operating or when power take-off 116 is in a nonoperative state. This may occur, for instance, when a user moves the ignition switch 124, to a position in which engine 404 is in a non-operative state, or when power take-off switch 126 is in an off position. However, under these circumstances, it may still be desirable to supply sufficient electrical power to subcomponents 416 (or a subset of those subcomponents) for diagnostic or other purposes even when neither generator 405 nor 422 is operating. For instance, the operator may wish to have diagnostics performed on the planter, without turning on the engine of vehicle 100. Therefore, one or both of control systems 406 and 426 can detect this and control load center 414 to switch from powering the subset of subcomponents 416 using generator 405 and/or 422 to powering them using a supplemental electrical power supply system.

In one example, the supplemental electrical power supply system can include battery 402 of agricultural vehicle 100, which can provide power over power bus 408A of agricultural vehicle 100, electrical link 421, power bus 408A of row unit 204 and through a switch in load center 414. The control system(s) can automatically control load center 414 to switch to battery 402 based on a user input moving ignition switch 124 to the "on" position but not to the "start" position, and when engine 404 is not running.

Thus, when generator 405 and/or 422 is in a nonoperative state, electrical power to subcomponents 416 (or a subset of those components) may be provided by battery 402 of agricultural vehicle 100. In one example, the battery 402 may be configured to supply 12 volts. Additionally, it is also expressly contemplated that a battery 430 may also be provided on row unit 204, and can be configured to supply electrical energy to load center 414 under varying conditions.

Figure 4B:
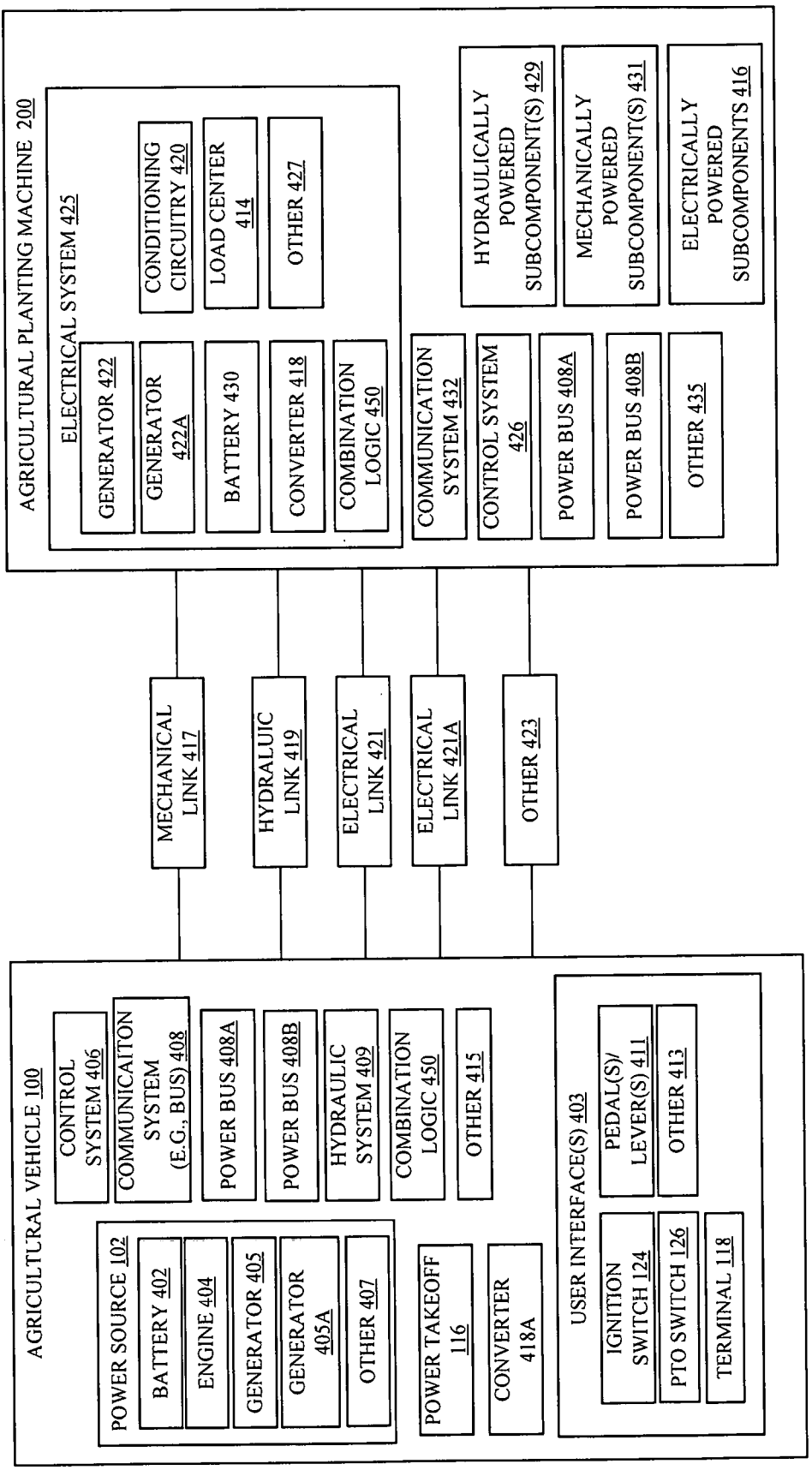
FIG. 4B is a block diagram of an agricultural vehicle coupled to a row unit in accordance with another example.

FIG. 4B shows another example of a block diagram of agricultural vehicle 100 and planting machine 200. FIG. 4B is used to illustrate a scenario in which power at a first voltage potential (e.g., 56V), generated by one of the power systems, is converted to a second voltage potential (e.g., 12V) and is combined with power output by a second power system to augment the output of the second power system. However, before describing the operation of the example shown in FIG. 4B in more detail, FIGS. 5 and 6 will first be described to further illustrate the scenario discussed with respect to FIG. 4A. A more detailed description of FIG. 4B is set out below after the description of FIG. 6.

Figure 5:
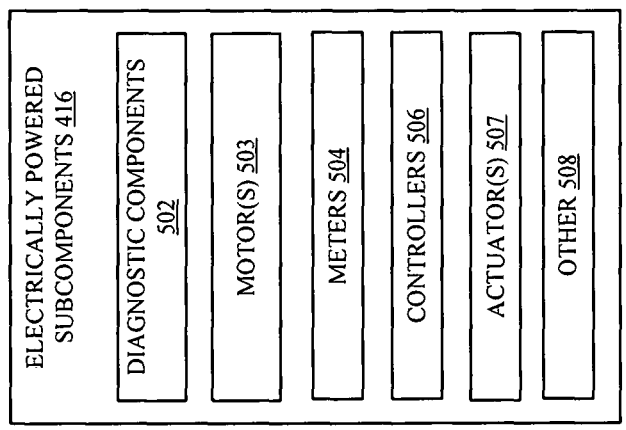
FIG. 5 is a block diagram of a variety of electrically powered agricultural subcomponents.

FIG. 5 shows one example of subcomponents 416 in more detail. As illustratively shown in FIG. 5, subcomponents 416 of machine 200 (or row unit 204) may include diagnostic components 502, various motors 503, meters 504, one or more controllers 506, other actuators 507 and other components 508 including a variety of sensors, etc. The subcomponents 416 may be powered by the same voltage potential or groups of those subcomponents may be powered by different voltage potentials (e.g., some may be powered by a 56V supply while others may be powered by a 12V supply).

In one example, there may be times when both electrical power sources (e.g., the source 102 on vehicle 100 and the sources 422, 430, 418 on machine 200) are active and available simultaneously and are able to provide sufficient electrical power to load center 414, such that load center 414 is able to provide the electrical power to subcomponents 416. Thus, load center 414 can be controlled to select any of the electrical power supply systems based on a received user input or a predetermined preference for one electrical power supply system, or based on other detectable circumstances. For example, electrical energy provided by generator 422 and converter 418 may be the primary source of electrical energy for subcomponents 416, regardless of whether electrical energy is available through link 421. In that scenario, this allows for a reduced number of connectors between agricultural vehicle 100 and row unit 204. Additionally, this may also serve to improve the power quality of the electrical energy as it is provided from generator 422 and converter 418, which are closely proximate the subcomponents they power. Therefore, even when both electrical power supply systems are available, generator 422 and converter 418 may be the primary source of electrical power selected by load center 414, and, only when generator 422 and converter 418 are inoperative, will load center 414 source power from electrical link 421. However, in other scenarios, the electrical power (such as from generator 405) provided through link 421 may be the preferred source. All of these architectures are contemplated herein.

In some circumstances, as mentioned above, it may be advantageous to determine a particular operating state of the electrical power supply systems. For example, controller 426 and/or controller 406 (referred to herein as controller 426/406) may be able to determine an availability of electrical energy from either or both electrical power supply systems. Based on the determination, controller 426/406 may then generate and provide a control signal to load center 414 to control load center 414 to automatically source power from an available electrical power supply system, when one is unavailable. In one example, controller 426/406 may detect an availability by determining an operating state of generator 405 and/or generator 422. In another example, controller 426/406 can determine an operating state of generator 405 and/or generator 422 through a position of ignition switch 124. If it is off (such as when engine 404 or PTO 116 are off) it can switch to providing power from battery 402.

Additionally, it may be advantageous to establish a hierarchical structure in regards to subcomponents 416. For example, upon detecting an availability of an electrical power supply system, subcomponents 416 may receive electrical energy in an ordered fashion, such that more important subcomponents 416 receive electrical energy before other subcomponents 416 based on the available power capacity. In one example, this may occur when only a limited amount of power is available, and may result in diagnostic components 502 preferentially receiving power before meters 504. This may enable a user operating an agricultural vehicle to continue running diagnostics while a limited amount of electrical power is available. In one example, the user is able to provide user inputs to reconfigure the hierarchical structure based on various circumstances.

Figure 6:
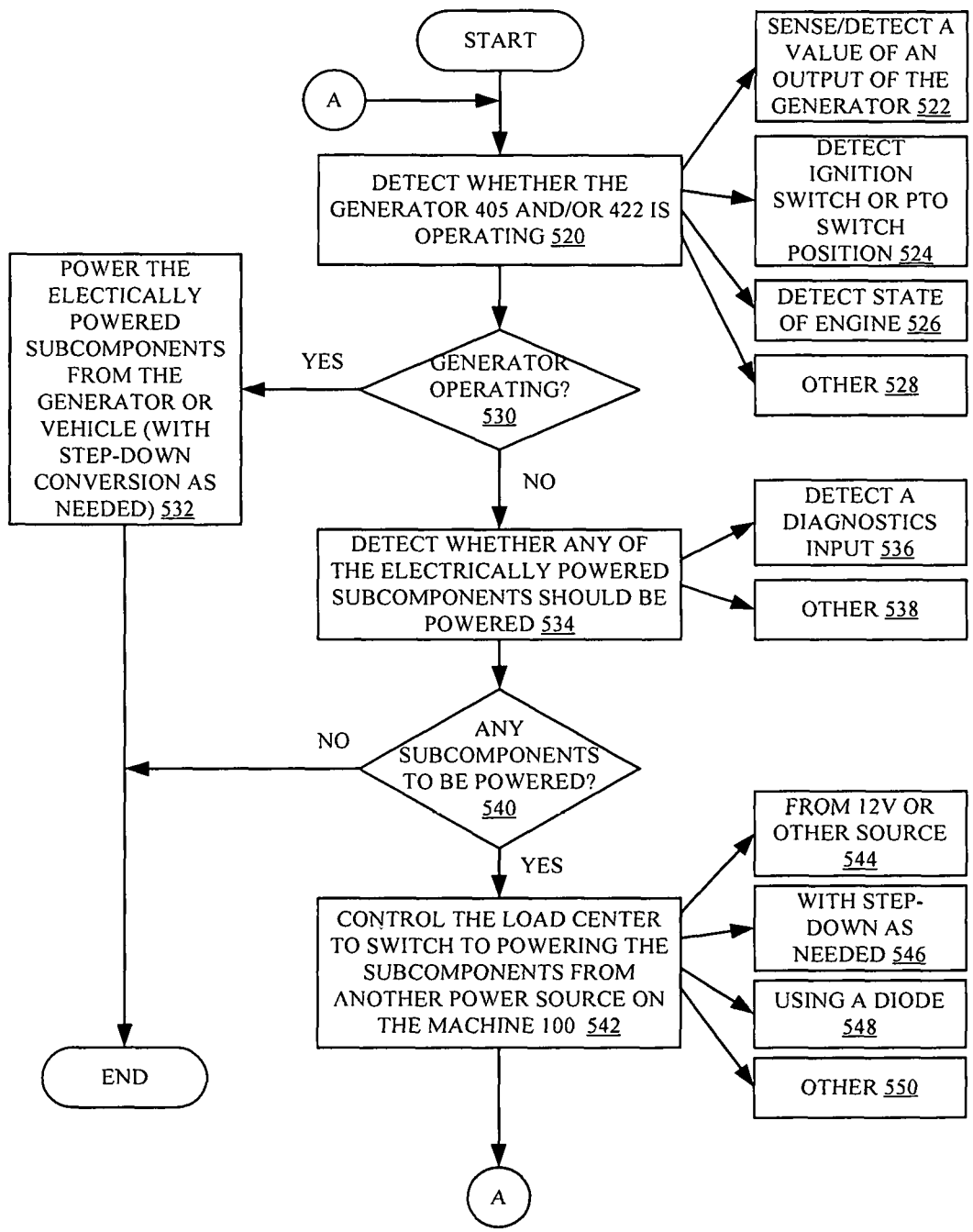
FIG. 6 is a flow diagram illustrating one example of the operation of the towed agricultural machine in providing electrical power to an electrically powered subcomponent of the towed agricultural machine in accordance with one example.

FIG. 6 is a flow diagram illustrating one example of the operation of the machines shown in FIG. 4A in providing electrical power to a subcomponent 416 of a row unit 204. Method 600 may be used to supply electrical power to a subcomponent 416 frame one power supply when another one of the power supplies is inoperative.

In order to switch the supply of power to some or all of the electrically powered subcomponents 416 from being powered by either generator 405 or generator 422 to being powered by another source (e.g., battery 402) on vehicle 100, it is first detected whether the power from the generator 405 and/or 422 is available. This is indicated by block 520 in FIG. 6 and it can be done in a variety of different ways. For instance, control system 426 (or another sensor) can detect a value of the power output of generator 405 and/or 422 to see whether it is generating power. This is indicated by block 522. In another example, control system 406 (or another sensor) can sense whether the ignition switch 124 or the PTO switch 126 are in positions which would indicate that generator 405 and/or 422 is not operating. For instance, if generator 422 is powered by PTO 116, or in some other way by engine 404, and the corresponding switches are in a position which would indicate they are off, then this indicates that generator 422 is off as well. This is indicated by block 524. Further, the state of engine 404 can be detected. If it is not running, then generator 405 is not operating and the PTO 116 will not be running either. Detecting the state of engine 404 is indicated by block 526. Detecting whether power is available from generator 405 and/or 422 can be done in other ways as well, and this is indicated by block 528.

If the generator 405 and/or 422 is operating, and power is available from it, as indicated by block 530, then load center 414 is controlled to power the electrically powered subcomponents 416, that are powered by generator 405 and/or 422, using generator 405 and/or 422, as desired. This can include stepping down the voltage provided by the generators as desired or needed as well. This is indicated by block 532.

However, if, at block 530, it is determined that power from generator 405 and/or 422 is unavailable, then control system 426 detects whether any or all of the electrically powered subcomponents 416 should still be powered under the present circumstances. This is indicated by block 534 in FIG. 6. This may be based on the position of switches or on other operator inputs. For instance, it may be that the operator has turned ignition switch 124 to the On position, but engine 404 is not running. It may also be that the operator has provided an input to have diagnostics run on machine 200 by diagnostic components 502. In that case, control system 426 will receive a signal requesting diagnostics and thus determine that diagnostic components 502 should be powered, even though generator 405 and/or 422 is not on. This is indicated by block 536 in FIG. 6. Detecting that some or all of the subcomponents 416 should be powered can be done in other ways as well, and this is indicated by block 538.

If it is determined that none of the electrically powered subcomponents 416 are to be powered, as indicated by block 540, then processing is complete. However, if, at block 540, it is determined that some or all of the subcomponents 416 are to be powered, then control system 426 controls load center 414 to switch to provide power from machine 100. This is indicated by block 542. This can also be done in a variety of different ways.

For instance, control system 426 can generate a control signal to control load center 414 to switch so that it powers the subcomponents 416 from a 12-volt supply (e.g., battery 402) on machine 100. This is indicated by block 544. Also, the received voltage can be stepped down or otherwise modified before being provided to the subcomponents 416 as well. This is indicated by block 546. The switching can be done in other ways as well, such as using a diode that switches in power from machine 100 when power from generator 405 and/or 422 is not available. This is indicated by block 548. The switching can be accomplished in still other was as well, and this is indicated by block 550. If power from generator 405 and/or 422 is restored, then the source of the power to the subcomponents 416 will be switched back. This is indicated by blocks 520-532.

FIG. 4B is a block diagram showing another example of agricultural vehicle 100 and agricultural planting machine 200, and it will be used to illustrate another scenario in which one power supply can be used to augment another. Some items in FIG. 4B are similar to those shown in FIG. 4A and they are similarly numbered. However, in the example shown in FIG. 4B, it is assumed that agricultural vehicle 100 and agricultural planting machine 200 each have two separate power busses that provide power from different sources at two different voltage potentials to power the different subcomponents 416. The two different sources can both be on vehicle 100. They can both be on machine 200, or they can be split between vehicle 100 and machine 200. Various different architectures are discussed below. FIG. 4B will also be described to show how the power from the first power source can be converted and combined with power from the second power source, to augment power provided by the second source.

As an example, it will be assumed that some of the subcomponents on machine 200 are powered with a 12V potential while others are powered with a 56V potential. It may be that the demand for power at 12V exceeds the capacity of the 12V power source, but the demand for power at 56V does not meet the capacity generated by the 56V source. In that case, a portion of the 56V power can be converted to 12V and used to augment power on the 12V bus to increase the amount of 12V power available to the subcomponents. In one example, regardless of whether the 12V and 56V sources are both on vehicle 100, are both on machine 200, are split between vehicle 100 and machine 200, or there are 12V and 56V generators on both vehicle 100 and machine 200, the power at one voltage potential (which has a lower demand) can be converted and combined with power at a second voltage potential (which has a higher demand) to augment the power available at the second voltage potential, to help meet the higher demand.

For instance, FIG. 4B shows that agricultural vehicle 100 can have at least two different electrical power sources, such as generators 405 and 405A. For the sake of the present discussion, it will be assumed that generator 405 generates power at a first voltage potential, such as 56V. It is also assumed that generator 405A generates power at a second voltage potential, such as 12V. Generator 405 provides its power to various subcomponents over power bus 408A, while generator 405A provides its power to various subcomponents over power bus 408B. Similarly, agricultural planting machine 200 can have two separate power buses 408A and 408B which are connected to power buses 408A and 408B on vehicle 100 over separate electrical links 421 and 421A, respectively. Thus, individual subcomponents can be powered by the different voltage potentials on the different power buses on vehicle 100 and machine 200.

Similarly, FIG. 4B shows that, in one example, machine 200 can have generators 422 and 422A, which generate power at 12V and 56V, respectively. These generators can be provided in addition to, or instead of, generators 405 and 405A. These and other architectures are contemplated herein.

Combination logic 450 can be located on vehicle 100, or on machine 200, or on both. In one example, combination logic 450 detects when the demand for 12V power exceeds a threshold value (which may be based on the output capacity of the 12V generator 405A and/or generator 422) and then controls converter 418A (and/or converter 418) to convert power from generator 405 (and/or generator 422A) from 56V to 12 V and combine it with the 12V power output by generator 405A (and/or generator 422) on power bus 408B.

By way of example, assume that the architecture shown in FIG. 4B has a 12V source (battery 430) on machine 200 that provides 12V power, and generator 405 on vehicle 100 that provides 56V power. Combination logic 450 may be disposed on machine 200 and detect (such as using a diode) that the power requirements at the 12V potential exceed the capacity of battery 430 (or exceed some other threshold value). In that case, combination logic 450 controls converter 418 to convert the power output by generator 405, and available on bus 408A, to 12V and combine it with the other 12V power available on bus 408B. In this way, the output of one of the two generators can be used to augment the output of the other of the two generators.

The voltage conversion (such as using a step-down converter) can be done anywhere between the power source and the component that consumes the power. Similarly, the combination of power from one source to augment that output by another source can also be done substantially anywhere between the power source and the consuming subcomponent.

It can thus be seen that the present description describes how power at various different voltages can be obtained on an agricultural machine. When a power source on the machine is not available, the power can be obtained from an external source. It can be modified, such as stepped down or otherwise modified, in a variety of different ways.

Example 1 is an agricultural machine, comprising:
a converter configured to receive a first voltage potential from a generator and convert the first voltage potential to a second voltage potential;
an electrically powered subcomponent powered by a power input at the second voltage potential; and
a load center configured to switch from applying, as the power input to the electrically powered subcomponent, the second voltage potential, output by the converter, to applying, as the power input to the electrically powered subcomponent, the second voltage potential, received from a source external to the agricultural machine.

Example 2 is the agricultural machine of any or all previous examples wherein the load center comprises:
a switch configured to detect an absence of the second voltage potential output by the converter and switch to applying the second voltage potential received from the source external to the agricultural machine.

Example 3 is the agricultural machine of any or all previous examples wherein the load center comprises:
a control system configured to detect the absence of the second voltage potential output by the converter and to generate a control signal to control the switch to apply the second voltage potential received from the source external to the agricultural machine to the electrically powered subcomponent.

Example 4 is the agricultural machine of any or all previous examples wherein the agricultural machine comprises a towed agricultural machine, towed by a towing vehicle, and wherein the source external to the agricultural machine comprises a source on the towing vehicle, and further comprising:
an electrical link configured to couple the source on the towing vehicle to the switch.

Example 5 is the agricultural machine of any or all previous examples wherein the towing vehicle includes an ignition switch movable among an off position, an on position and a start position, and an engine, wherein the generator is configured to be powered by the engine on the towing vehicle.

Example 6 is the agricultural machine of any or all previous examples wherein the electrically powered subcomponent comprises:
a diagnostic component configured to run a diagnostic on the agricultural machine in response to receiving a diagnostic request input from the towing vehicle, and wherein the diagnostic component comprises one of a plurality of electrically powered subcomponents on the agricultural machine.

Example 7 is the agricultural machine of any or all previous examples wherein the control system is configured to detect that the generator is not operating and to detect the diagnostic request input and control the switch to apply the second voltage potential received from the source on the towing vehicle to the diagnostic component.

Example 8 is the agricultural machine of any or all previous examples wherein the control system is configured to detect that position of the ignition switch is on, the engine is off, and the diagnostic request input, and to control the switch to apply the second voltage potential received from the source on the towing vehicle to the diagnostic component.

Example 9 is the agricultural machine of any or all previous examples and further comprising:
a row unit of a planter, wherein the electrically powered subcomponent is disposed on the row unit.

Example 10 is the agricultural machine of any or all previous examples wherein the converter is configured to convert the first voltage potential to the second voltage potential of 12 volts.

Example 11 is the agricultural machine of any or all previous examples wherein the first voltage potential comprises 48 volts and wherein the converter comprises a DC to DC converter that converts the 48 volts to the second voltage potential of 12 volts.

Example 12 is the agricultural machine of any or all previous examples wherein the first voltage potential comprises 56 volts and wherein the converter comprises a DC to DC converter that converts the 56 volts to the second voltage potential of 12 volts.

Example 13 is an agricultural machine, comprising:
a first generator configured to generate a first voltage potential;
a converter configured to convert the first voltage potential generated by the first generator to a second voltage potential;
a plurality of electrically powered subcomponents powered by a power input at the second voltage potential; and
combination logic configured to switch from applying, as the power input to at least a subset of the plurality of electrically powered subcomponents, a second voltage potential, output by a power source, to a combination of the second voltage potential output by the power source and the second voltage potential, output by the converter.

Example 14 is the agricultural machine of any or all previous examples wherein the combination logic is configured to detect the capacity output by the power source is below a threshold and to combine the second voltage potential output by the power source with the second voltage potential output by the converter.

Example 15 is the agricultural machine of any or all previous examples wherein the subset of electrically powered subcomponents comprises:
a diagnostic component configured to run a diagnostic on the agricultural machine in response to receiving a diagnostic request input from the towing vehicle.

Example 16 is the agricultural machine of any or all previous examples and further comprising:
a row unit of a planter, wherein the diagnostic component is disposed on the row unit.

Example 17 is a method of providing power on a towed agricultural machine, the method comprising:
converting a first voltage potential to a second voltage potential;
detecting that the second voltage potential, that is converted from the first voltage potential, is unavailable;
receiving the second voltage potential from a source on a towing vehicle that tows the towed agricultural machine; and
based on detecting that the second voltage potential, that is converted from the first voltage potential, is unavailable, switching from applying, as a power input to an electrically powered subcomponent on the towed agricultural machine, the second voltage potential that is converted from the first voltage potential, to applying, as the power input to the electrically powered subcomponent, the second voltage potential, received from the source on the towing vehicle.

Example 18 is the method of any or all previous examples wherein the electrically powered subcomponent comprises a diagnostic component configured to run a diagnostic on the towed agricultural machine and wherein detecting that the second voltage potential is unavailable comprises:
detect that a position of an ignition switch on the towing vehicle is in an on position, and that an engine on the towing vehicle is off.

Example 19 is the method of any or all previous examples and wherein switching further comprises:
detecting a diagnostic request input from the towing vehicle; and
controlling a switch to apply the second voltage potential received from the source on the towing vehicle to the diagnostic component.

Example 20 is the method of any or all previous examples wherein converting the first voltage potential to the second voltage potential comprise:
converting the first voltage potential to 12 volts.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural machine, comprising:
a converter configured to receive a first voltage potential from a generator and convert the first voltage potential to a second voltage potential;
an electrically powered subcomponent powered by a power input at the second voltage potential; and
a load center configured to switch from applying, as the power input to the electrically powered subcomponent, the second voltage potential, output by the converter, to applying, as the power input to the electrically powered subcomponent, the second voltage potential, received from a source external to the agricultural machine.

2. The agricultural machine of claim 1 wherein the load center comprises:
a switch configured to detect an absence of the second voltage potential output by the converter and switch to applying the second voltage potential received from the source external to the agricultural machine.

3. The agricultural machine of claim 2 wherein the load center comprises:
a control system configured to detect the absence of the second voltage potential output by the converter and to generate a control signal to control the switch to apply the second voltage potential received from the source external to the agricultural machine to the electrically powered subcomponent.

4. The agricultural machine of claim 2 wherein the agricultural machine comprises a towed agricultural machine, towed by a towing vehicle, and wherein the source external to the agricultural machine comprises a source on the towing vehicle, and further comprising:
an electrical link configured to couple the source on the towing vehicle to the switch.

5. The agricultural machine of claim 4 wherein the towing vehicle includes an ignition switch movable among an off position, an on position and a start position, and an engine, wherein the generator is configured to be powered by the engine on the towing vehicle.

6. The agricultural machine of claim 5 wherein the electrically powered subcomponent comprises:
a diagnostic component configured to run a diagnostic on the agricultural machine in response to receiving a diagnostic request input from the towing vehicle, and wherein the diagnostic component comprises one of a plurality of electrically powered subcomponents on the agricultural machine.

7. The agricultural machine of claim 6 wherein the control system is configured to detect that the generator is not operating and to detect the diagnostic request input and control the switch to apply the second voltage potential received from the source on the towing vehicle to the diagnostic component.

8. The agricultural machine of claim 7 wherein the control system is configured to detect that position of the ignition switch is on, the engine is off, and the diagnostic request input, and to control the switch to apply the second voltage potential received from the source on the towing vehicle to the diagnostic component.

9. The agricultural machine of claim 1 and further comprising:
a row unit of a planter, wherein the electrically powered subcomponent is disposed on the row unit.

10. The agricultural machine of claim 9 wherein the converter is configured to convert the first voltage potential to the second voltage potential of 12 volts.

11. The agricultural machine of claim 10 wherein the first voltage potential comprises 48 volts and wherein the converter comprises a DC to DC converter that converts the 48 volts to the second voltage potential of 12 volts.

12. The agricultural machine of claim 10 wherein the first voltage potential comprises 56 volts and wherein the converter comprises a DC to DC converter that converts the 56 volts to the second voltage potential of 12 volts.

13. An agricultural implement, comprising:
a converter configured to convert a first voltage potential generated by a generator on the implement to a second voltage potential;
a plurality of electrically powered subcomponents powered by a power input at the second voltage potential; and
a switching component configured to switch from applying, as the power input to a subset of the plurality of electrically powered subcomponents, the second voltage potential, output by the converter, to applying, as the power input to the subset of the plurality of electrically powered subcomponents, the second voltage potential, received from a source on a towing vehicle that tows the agricultural machine.

14. The agricultural implement of claim 13 wherein the switching component comprises:
a switch; and
a control system configured to detect the absence of the second voltage potential output by the converter and to generate a control signal to control the switch to apply the second voltage potential received from the source on the towing vehicle to the subset of the electrically powered subcomponents.

15. The agricultural implement of claim 14 wherein the subset of electrically powered subcomponents comprises:
a diagnostic component configured to run a diagnostic on the agricultural implement in response to receiving a diagnostic request input from the towing vehicle.

16. The agricultural implement of claim 15 and further comprising:
a row unit of a planter, wherein the diagnostic component is disposed on the row unit.

17. A method of providing power on a towed agricultural machine, the method comprising:
converting a first voltage potential to a second voltage potential;
detecting that the second voltage potential, that is converted from the first voltage potential, is unavailable;
receiving the second voltage potential from a source on a towing vehicle that tows the towed agricultural machine; and
based on detecting that the second voltage potential, that is converted from the first voltage potential, is unavailable, switching from applying, as a power input to an electrically powered subcomponent on the towed agricultural machine, the second voltage potential that is converted from the first voltage potential, to applying, as the power input to the electrically powered subcomponent, the second voltage potential, received from the source on the towing vehicle.

18. The method of claim 17 wherein the electrically powered subcomponent comprises a diagnostic component configured to run a diagnostic on the towed agricultural machine and wherein detecting that the second voltage potential is unavailable comprises:
detecting that a position of an ignition switch on the towing vehicle is in an on position, and that an engine on the towing vehicle is off.

19. The method of claim 18 and wherein switching further comprises:
detecting a diagnostic request input from the towing vehicle; and
controlling a switch to apply the second voltage potential received from the source on the towing vehicle to the diagnostic component.

20. The method of claim 19 wherein converting the first voltage potential to the second voltage potential comprises:
converting the first voltage potential to 12 volts.

* * * * *